(12) United States Patent
Reynolds

(10) Patent No.: US 10,990,225 B2
(45) Date of Patent: Apr. 27, 2021

(54) DISPLAY-INTEGRATED OPTICAL SENSOR WITH FOCUSED AND FOLDED LIGHT PATH

(71) Applicant: Synaptics Incorporated, San Jose, CA (US)

(72) Inventor: Joseph Kurth Reynolds, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/450,211

(22) Filed: Jun. 24, 2019

(65) Prior Publication Data

US 2020/0401269 A1 Dec. 24, 2020

(51) Int. Cl.
*G06F 3/042* (2006.01)
*G06F 3/041* (2006.01)
*G06K 9/00* (2006.01)

(52) U.S. Cl.
CPC .......... *G06F 3/0421* (2013.01); *G06F 3/0412* (2013.01); *G06K 9/0004* (2013.01); *G06K 9/0008* (2013.01)

(58) Field of Classification Search
CPC ... G06F 3/0421; G06F 3/0412; G06K 9/0004; G06K 9/0008
See application file for complete search history.

(56) References Cited

U.S. PATENT DOCUMENTS

| | | | |
|---|---|---|---|
| 9,581,796 B2* | 2/2017 | Leonhardt | G02B 17/086 |
| 10,488,606 B2* | 11/2019 | Wiltberger | G02B 26/0816 |
| 2017/0176698 A1* | 6/2017 | Ho | G02B 6/4214 |
| 2020/0034602 A1* | 1/2020 | He | G06K 9/0004 |

* cited by examiner

*Primary Examiner* — Charles V Hicks
(74) *Attorney, Agent, or Firm* — Leydig, Voit & Mayer, Ltd.

(57) ABSTRACT

A method for optically imaging an object using a display device includes: illuminating, by the display device, an object at a sensing region corresponding to an optical sensor of the display device; conditioning, by the display device, light from the sensing region, wherein conditioning the light includes focusing and reflecting the light; receiving, by the display device, the conditioned light at photodetectors of the optical sensor; and generating, by a processing system associated with the display device, an image of the object based on the conditioned light received at the photodetectors of the optical sensor.

21 Claims, 15 Drawing Sheets

DISPLAY-INTEGRATED OPTICAL SENSOR WITH FOCUSED AND FOLDED LIGHT PATH

BACKGROUND

Sensor devices are widely used in a variety of electronic systems. For example, fingerprint sensor devices are often used as input devices for various computing systems (such as fingerprint readers integrated in or peripheral to notebook or desktop computers, or mobile devices such as smartphones and tablets).

Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices. Some applications, such as those related to mobile devices, may benefit from recognition systems that are both small in size and highly reliable. Fingerprint sensor devices typically include a sensing region, often demarked by a surface, in which the fingerprint sensor device determines presence, location, motion, and/or features of a fingerprint or partial fingerprint, typically for purposes relating to user authentication or identification of a user.

Most commercially available fingerprint sensors are based on optical or capacitive sensing technologies. Optical fingerprint sensors usually utilize an optical element to condition light before the light reaches the sensor elements. It remains challenging to fit conventional optical elements into the limited height available in relatively small spaces, such as found in a display stack of an electronic device.

In electronic devices having touchscreen displays, one or more sensor devices may be incorporated in a bezel around the display or may be incorporated under the display. The sensor device may be an optical sensor device, such as an optical fingerprint sensor. Implementing an optical sensor under the display, as opposed to outside of the display, may have the advantage that the footprint of the bezel can be reduced, but it may also disadvantageously increase the thickness of the electronic device.

SUMMARY

In an exemplary embodiment, an optical sensor device includes: a substrate; a first reflector disposed on the substrate; and an optical sensor disposed on the substrate. The first reflector is configured to reflect light from a sensing region corresponding to the optical sensor towards a photodetector of the optical sensor.

In another exemplary embodiment, a display device includes: a display; and an optical sensor device configured to image an object. The optical sensor device includes: a substrate; a first reflector disposed on the substrate; and an optical sensor disposed on the substrate. The first reflector is configured to reflect light from a sensing region corresponding to the optical sensor towards a photodetector of the optical sensor.

In yet another exemplary embodiment, a method for optically imaging an object using a display device includes: illuminating, by the display device, an object at a sensing region corresponding to an optical sensor of the display device; conditioning, by the display device, light from the sensing region, wherein conditioning the light includes focusing and reflecting the light; receiving, by the display device, the conditioned light at photodetectors of the optical sensor; and generating, by a processing system associated with the display device, an image of the object based on the conditioned light received at the photodetectors of the optical sensor.

DETAILED DESCRIPTION

The following detailed description is exemplary in nature and is not intended to limit the disclosure or the application and uses of the disclosure. Furthermore, there is no intention to be bound by any expressed or implied theory presented in the preceding background and brief description of the drawings, or the following detailed description.

Exemplary embodiments of the present disclosure provide an optical sensor configured with a folded light path, a device having an optical sensor configured to condition light in a folded light path, and a process for fabricating an optical sensor configured with a folded light path. Exemplary embodiments of the present disclosure are thus able to achieve relatively thinner optical sensors and relatively thinner display devices having optical sensors, often fabricated with fewer or shared layers than unfolded alternatives.

Figure 1:
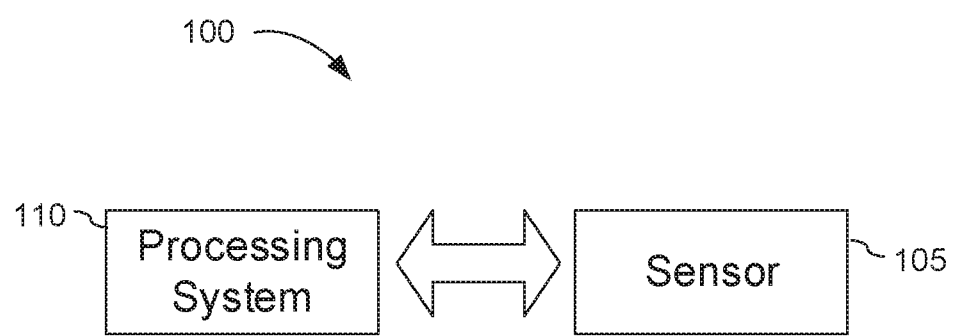
FIG. 1 is a block diagram of an example input device.

FIG. 1 is a block diagram of an example input device 100 within which exemplary embodiments of the present disclosure may be implemented. The input device 100 may be configured to provide input to an electronic system. As used in this document, the term "electronic system" (or "electronic device") broadly refers to any system capable of electronically processing information. Examples of electronic systems include personal computing devices (e.g., desktop computers, laptop computers, netbook computers, tablets, web browsers, e-book readers, and personal digital assistants (PDAs)), wearable computers (e.g., smart watches and activity tracker devices), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (including cellular phones, such as smart phones), and media devices (e.g., recorders, editors, and players such as televisions, set-top boxes, music players, digital photo frames, and digital cameras). Additionally, the electronic system could be a host or a slave to the input device 100.

The input device 100 may be implemented as a physical part of the electronic system, or may be physically separate from the electronic system. The input device 100 may be coupled to (and communicate with) components of the electronic system using wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, input device 100 includes a sensor 105. The sensor 105 comprises one or more sensing elements configured to sense input provided by an input object (e.g., a finger, styli, hand) in a sensing region of the input device 100. The sensing region may encompass any space above, around, in and/or proximate to the sensor 105 in which the input device 100 is able to detect an input from the input object. The sizes, shapes, and/or locations of particular sensing regions (e.g., relative to the electronic system) may vary depending on actual implementations. In some embodiments, the sensing region may extend from a surface of the input device 100 in one or more directions into space, for example, until signal-to-noise ratio (SNR) of the sensors fall below a threshold suitable for accurate object detection. For example, the distance to which this sensing region extends in a particular direction may be on the order of less than a millimeter, millimeters, centimeters, or more, and may vary significantly with the type of sensing technology used and the accuracy desired. In some embodiments, the sensor 105 may detect input involving no physical contact by an input object with any surfaces of the input device 100, contact by the input object with an input surface of the input device 100, contact by the input object with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 may utilize optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, complementary metal-oxide-semiconductor (CMOS) image sensor arrays, charge-coupled device (CCD) arrays, and other suitable photosensors sensitive to light in wavelength(s) of interest. Active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration of the input device 100. One or more light sources, e.g., a subpixel of a display, and/or light guiding structures may be used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object as it contacts the input surface, where the light is directed to the input surface at an angle of incidence at which it is totally internally reflected, except at locations where the input object is in contact and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. This may be used to image small scale surface variations of the input object, such as fingerprint patterns, where the internal reflectivity of the incident light differs depending on whether a ridge or valley of the finger is in contact with that portion of the input surface.

In FIG. 1, a processing system 110 is included with the input device 100. The processing system 110 may comprise parts of or all of one or more integrated circuits (ICs) and/or other circuitry components. The processing system 110 may be coupled to the sensor 105, and may be configured to detect input in the sensing region using the sensor 105.

The processing system 110 may include driver circuitry configured to drive the sensor 105 and/or receiver circuitry configured to receive resulting signals from the sensor 105. For example, the processing system 110 may include driver circuitry configured to drive illumination signals to one or more light-emitting diodes (LEDs) or other light sources (e.g., display subpixels) of the input device 100, and/or receiver circuitry configured to receive signals from the optical receiving elements of the input device 100 to signal or drive an associated display device to illuminate a portion of the display.

The processing system 110 may include computer-readable instructions, such as firmware code, software code, and/or the like. The processing system 110 may be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor 105. As another example, the processing system 110 may perform electrical or spatial filtering or other signal conditioning. As yet another example, the processing system 110 may subtract or otherwise account for a baseline, such that the information reflects a difference between the electrical signals and the temporally low-pass filter baseline. As yet further examples, the processing system 110 may determine positional information, recognize inputs as commands, recognize handwriting, match biometric samples, and the like.

The sensing region of the input device 100 may overlap part or all of an active area of a display device, and the display device may include a touch screen interface. The display device may be any suitable type of dynamic display capable of displaying a visual interface to a user, including an inorganic micro-LED display, an organic LED (OLED) display, an active-matrix OLED (AMOLED) display, a liquid crystal display (LCD), a plasma display, an electroluminescence (EL) display, or other display technology. The display may be flexible or rigid, and may be flat, curved, or have other geometries. The display may include a glass or plastic (e.g., polyimide) substrate for thin-film transistor (TFT) circuitry, which may be used to address display pixels for providing visual information and/or providing other functionality. The display device may include a cover lens (sometimes referred to as a "cover glass" or "protective layer") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The display may also be a foldable, flexible, or bendable display which includes a clear, flexible protective cover layer (e.g., comprising acrylic, plastics, polyurethane hard coats, polyimides, etc.). The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2:
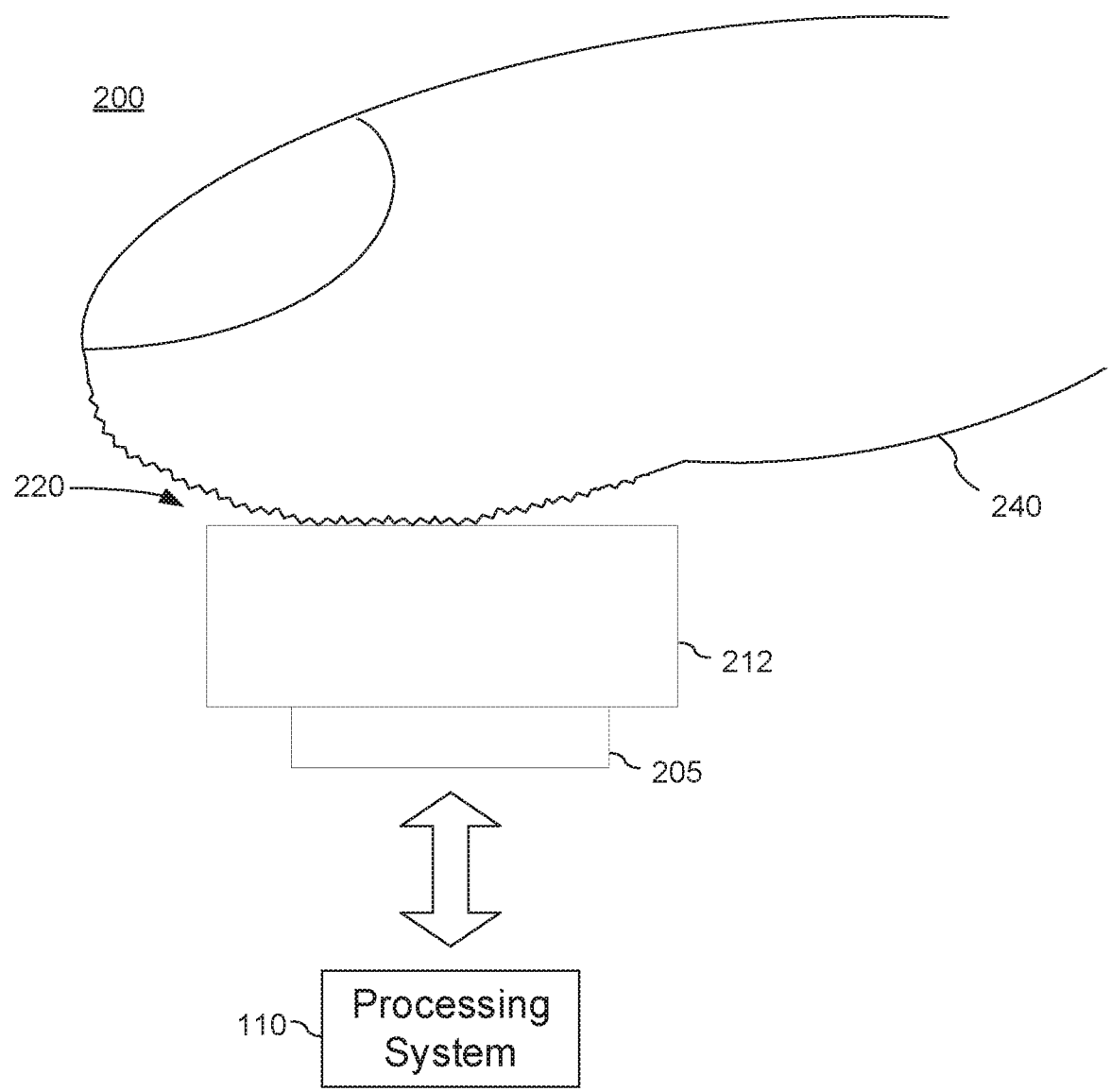
FIG. 2 is a block diagram of another example input device.

FIG. 2 is a block diagram of another example input device 200. In this embodiment, input device 200 includes a fingerprint sensor 205 which may be configured to capture a fingerprint from a finger 240. The fingerprint sensor 205 may be disposed underneath a cover layer (e.g., cover glass) 212 that provides an input surface for the fingerprint to be placed on or swiped over the fingerprint sensor 205. The sensing region 220 on the input surface may be an area larger than, smaller than, or similar in size to a full fingerprint. The fingerprint sensor 205 may be comprised of an array of sensing elements with a resolution configured to detect ridge-valley surface variations of the finger 240.

Figure 3:
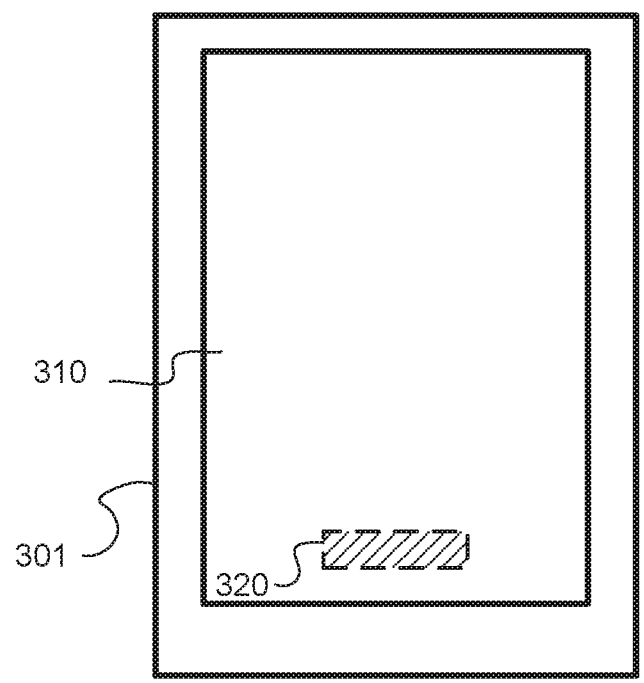
FIG. 3 is a schematic diagram illustrating an example display device having a display and an optical sensor.

FIG. 3 is a block diagram illustrating an example display device 301. The display device 301 may be, for example, a mobile device such as a smartphone or tablet. The display device 301 includes a display 310 which may be, for example, a touchscreen. An optical sensing area/region 320 overlaps with a touchscreen interface of the display 310. The optical sensing area/region 320 is associated with an optical sensor, which may be disposed under or within the display 310. The optical sensor may include an aperture layer in and/or below a semitransparent display focusing element and/or a reflective element, and the optical sensor may be, for example, an optical fingerprint sensor. In some embodiments, the display 310 is a semi-transparent display. The display 310 may also be, for example, an AMOLED display, or another type of transparent, light-emissive panel. The optical fingerprint sensor may include, for example, a charge integrating optical image sensor with an IR wavelength Cut filter installed, or may be another type of optical fingerprint sensor.

In other exemplary embodiments, the optical sensor may be integrated into a personal computer (PC) such as a laptop, or into an automobile human-machine interface.

Figure 4A:
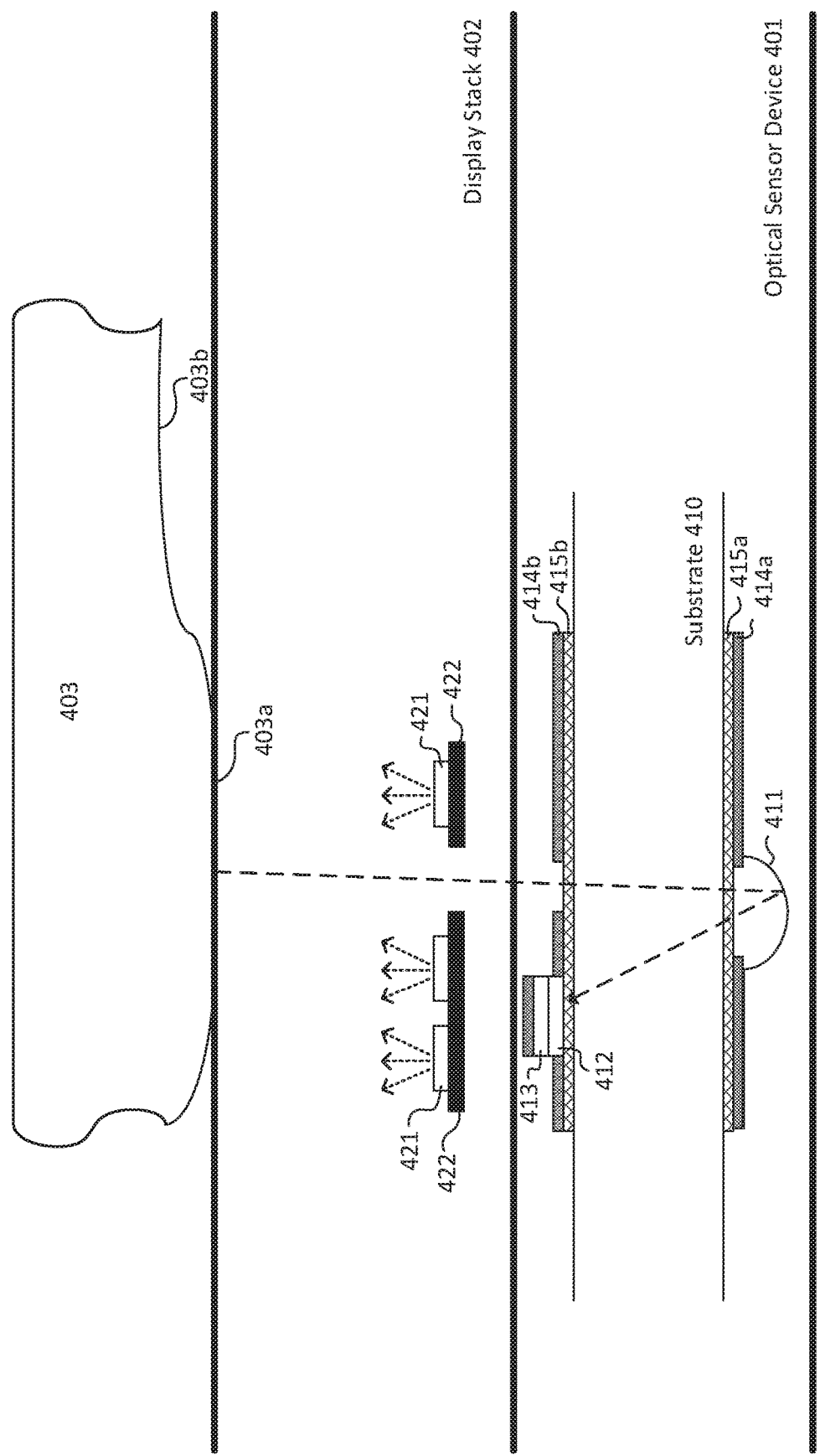
FIG. 4A is a schematic diagram illustrating an example display device having an optical sensor device with a folded light path.

FIG. 4A is a schematic diagram illustrating an example display device having an optical sensor device 401 with a folded light path.

The display device includes a display stack 402 having one or more light-emitting elements 421 and a plurality of light-blocking elements 422 (e.g., components of the display such as electrodes or circuitry which block light). In the example shown in FIG. 4A, the light-emitting elements 421 act as an illuminator for the optical sensor device 401 disposed below the display stack 402. The display stack 402 may include, for example, light-emitting diodes (LEDs), organic LEDs (OLEDs) (e.g., in a rigid OLED or flexible OLED configuration), or other types of illumination elements. It will be appreciated that FIG. 4A merely depicts an exemplary portion of some elements of the display stack 402.

In addition to or alternative to the light from the light-emitting elements 421, light may also be provided by an external illuminator or light source that is disposed above or below the optical sensor device 401. Including the external illuminator or light source allows for increased brightness and use of a particular or selected wavelength, and the external illuminator or light source may be invisible to a user of the display device.

An object 403 (such as a biometric object—e.g., a fingerprint) may be placed into a sensing region above the display stack 402. The display stack 402 may include, for example, a cover lens upon which the object 403 may be placed. The thickness of the display stack 402 may be, for example, approximately 200 µm. A portion of input object 403 (e.g., a ridge 403a) may be in contact while another portion (e.g., a valley 403b) may not be in contact, such that light emitting element 421 generates a response depending on the observed object 403, e.g., by absorption, transmission or reflection of light.

The display stack 402 includes openings through which light from the object 403 may pass through to the optical sensor device 401. In some exemplary implementations, the openings can be used to provide for conditioning (e.g., collimation) of the light passing through the display stack 402 and the optical sensor device 401. In other exemplary implementations, the conditioning (e.g., collimation) of the light is provided by one or more aperture layers in the optical sensor device 401. Conditioning (e.g., collimation, focusing, reflection) of the light serves to limit the observed angles of incident light which enter the light conditioning elements (e.g., openings in the display stack and/or apertures of one or more aperture layers) from a particular location (e.g., at the contact surface).

FIG. 4A also depicts an exemplary portion of some elements of the optical sensor device 401. The optical sensor device 401 includes photodetectors and corresponding circuitry (e.g., circuitry for electrical routing and other circuitry such as gates). An exemplary photodetector 412 and corresponding circuitry 413 are depicted in FIG. 4A. The photodetector 412 may be, for example, a photoresistor, a thin-film transistor (TFT) photodiode or an organic photodiode. The photodetector 412 may have, for example, a square shape or a hexagonal shape. The pitch of the photodetector 412 may be, for example, less than 100 µm (which would allow the optical sensor device to operate at a high enough resolution to resolve features of a fingerprint). In certain exemplary implementations, the pitch (e.g., the pattern pitch or rotation) of the photodetector 412 may be chosen so as to minimize the appearance of Moiré patterns (e.g., caused by interference of the light-blocking elements 422). Additionally, in certain exemplary implementations, the photodetector 412 may include an anti-reflective coating to prevent undesirable internal reflections off of the photodetector 412. This may be achieved by choosing periodic or aperiodic patterns which when convolved with the other light blocking objects have spatial frequency peaks outside of the range of interest, e.g., input features less than 20 microns or more than 500 microns.

The optical sensor device 401 further includes a substantially or semi transparent substrate 410, which is transparent to light of the relevant wavelengths that the photodetectors 412 are configured to detect. The transparent substrate 410 may be, for example, a glass substrate or a silicon substrate, or it may be, for example, a flexible substrate such as polyimide, PET (polyethylene terephthalate), or other organic flexible substrates. Light from the display stack 402 (for example, light emitted by light-emitting elements 421) illuminates the object 403, and light from a portion of the object 403 (e.g., ridge 403a) passes through both the display stack 402 and the transparent substrate 410. The light is then reflected off a reflective focal element 411 (e.g., a curved reflective focal element such as a curved mirror) and is received at the photodetector 412. The optical display device 401 depicted in FIG. 4A thus provides a folded light path having a fold and a focal element. In certain exemplary implementations, the area of the photodetector (e.g., the pitch squared for a square photodetector) may be less than half the area of the reflective focal element 411.

As depicted in FIG. 4A and as mentioned above, the optical sensor device 401 may further include one or more aperture layers which provide one or more apertures for conditioning light for reception by the photodetector 412. In the example shown in FIG. 4A, the display stack 402 may include openings between light-blocking elements 422 which may serve as apertures, the optical sensor device 401 may include an aperture layer 414a on a bottom side of the substrate 410, and/or the optical sensor device 401 may optionally include an aperture layer 414b on a top side of the substrate 410 for blocking light from other sources (e.g., to provide for internal blocking between detectors). It will be appreciated that some implementations include all three types of apertures, and that some other implementations include two out of the three types of apertures. There may also be additional aperture layers and light-blocking layers present in addition to aperture layers 414a, 414b and light-blocking elements 422. The aperture layers 414a, 414b of the optical sensor device 401 may, for example, be formed of mask material which is opaque to light (e.g., black or very dark absorptive material which avoids undesired reflections) . FIG. 4A depicts the aperture layer 414a disposed above the reflective focal element 411 to provide for light conditioning, but it will be appreciated that the opaque material may be disposed on both sides of the reflective focal element 411. Additionally, FIG. 4A depicts the aperture layer 414b disposed above the photodetector 412 and corresponding circuitry 413, but it will be appreciated that additional opaque material may be disposed below the photodetector 412 (with an additional aperture) for further light conditioning.

As depicted in FIG. 4A, the reflective focal element 411 is reflective and may have a curved shape. In some exemplary implementations, the reflective focal element 411 may be circular or of an oval or elliptical shape, e.g., shaped by photoresist reflow. In other exemplary implementations, the reflective focal element 411 can have a square or rectangular shape, or can be in a bent mirror configuration. In other exemplary implementations (for example as discussed below in connection with FIG. 6), a patterned phase mirror which behaves like a Fresnel mirror may be used. It will be appreciated that the focal point of the reflective focal element 411 may not be directly above the reflective focal element 411, and the reflective focal element 411 can redirect and focus light off to the side as depicted in FIG. 4A. It will be appreciated that while the reflective focal element 411 focuses the light towards the photodetector 412, the focal point of the reflective focal element 411 does not need to be exactly at the photodetector 412. In an exemplary embodiment, the focal point of the reflective focal element 411 is proximate to the photodetector such that parallel light beams and/or near-parallel light beams from the reflective focal element 411 are received at the photodetector 412. The position of the photodetector 412 thus corresponds to a bright spot of light reflected off and focused by the reflective focal element 411 (also referred to herein as a "focal region" corresponding to the reflective focal element 411). The spot size on the photodetector 412 is typically smaller than the size of the reflective focal element 411, the size of an aperture, and/or the size of the photodetector 412. Additionally, with the focal region of the reflective focal element 411 configured as being off to the side rather than directly above the reflective focal element 411, light that reaches the reflective focal element 411 through the apertures above the reflective focal element 411 is not reflected back up through the apertures.

The apertures or openings in the display stack 412 and in the one or more aperture layers, the reflective focal element 411, and the photodetector 412 should be properly aligned such that light (e.g., incident light beams within a certain angle relative to vertical) entering a top aperture will travel through the substrate 410, be reflected and focused by the reflective focal element 411, and reach the detector 412 at a position corresponding to a bright spot or focal region of the reflective focal element 411. Further, to mitigate the effect of potential internal reflections off the photodetector 412, the positioning of reflective focal elements of the optical device 411 may be configured such that internal reflections off the photodetector 412 based on light reflected by the reflective focal element 411 would not be received by neighboring reflective focal elements.

In some implementations, display stacks may be manufactured with predetermined locations of openings in the display stack through which light may be transmitted through the display stack. Thus, an optical sensor device may be designed such that the apertures of one or more aperture layers are aligned to the predetermined locations of openings in the display stack.

Due to the utilization of a folded light path as shown in FIG. 4A, the optical sensor device 401 may be thinner than conventional optical sensor devices which have lenses in combination with an air gap. For example, the optical sensor device 401 depicted in FIG. 4A may have a thickness of around 200 µm, whereas a conventional optical sensor device having lenses with an air gap may have a thickness of around 400 µm to 1 mm. It will be appreciated that the fabrication technology used for forming lenses in conventional optical sensor devices may also be utilized for forming the reflective focal element 411 depicted in FIG. 4A, along with a reflective layer, e.g., aluminum or other metal.

The optical sensor device 401 may further include one or more filter layers. The example depicted in FIG. 4A includes filter layers 415a, 415b on both sides of the substrate 410, but it will be appreciated that each filter layer is optional (e.g., some exemplary implementations may include filter layer 415b while not including filter layer 415a). These filter layers 415a, 415b may include one or more IR and/or red filters (e.g., absorbed or reflected IR or red light), one or more internally reflected light filters (which filter out undesirable visible light reflected off the sensing surface), and/or one or more ambient light filters (which filter out ambient light such as sunlight). As depicted in FIG. 4A, a filter layer including one or more of these filters can be disposed on a bottom side of the substrate 410, a top side of the substrate 410, or on both sides of the substrate 410. By utilizing these filters in connection with a folded light path, the light reflected off the object 403 passes through each filter layer 415a, 415b twice before reaching the photodetector 412. This increases the effectiveness of each filter and allows for thinner filters to be used. For example, passing through a particular filter once may provide 90% filtering, whereas passing through the filter twice provides 99% filtering.

It will be appreciated that FIG. 4A depicts merely a part of the optical sensor device 401 corresponding to a single photodetector 412 and a single reflective focal element 411 corresponding to a single pixel, and that the optical sensor device 401 may include a plurality of photodetectors 412, reflective focal elements 411, etc., corresponding to a plurality of pixels.

Additionally, in other exemplary implementations, instead of having a single photodetector 412 for each pixel, the optical sensor device may include multiple photodetectors corresponding to each pixel. For example, a 2×2 array of photodetectors or a 3×3 array of photodetectors may correspond to a respective bright spot provided by a respective reflective focal element. When the bright spot is positioned over certain photodetectors and not others, a selection can be made to utilize the input from the photodetector(s) detecting the bright spot and to disregard the input from photodetector(s) that do not detect a sufficient amount of light. A photodetector near the focal region does not image the collimated light. In other words, light is focused on one spot but not imaged.

Utilizing multiple photodetectors for each pixel decreases the effect of noise associated with any particular photodetector and also reduces the effect of angular sensitivity associated with any particular photodetector (by reducing the amount of light that hits each respective photodetector and improving selectivity for collimated light positions). Utilizing multiple photodetectors for each pixel may further provide for better manufacturing tolerances and may allow better responsiveness to illumination.

It will be appreciated that the elements depicted in FIG. 4A are not necessarily illustrated to scale. The combined thickness occupied by the reflective focal elements, photodetectors, the circuitry corresponding to the photodetectors, the aperture layers, and the filter layers may be, for example, 5 µm or less, and the thickness of the substrate 410 may be, for example, between approximately 20 µm and 200 µm.

It will be appreciated that not all of the elements depicted in FIG. 4A are required in accordance with exemplary embodiments of the described optical sensor device 401. For example, as discussed above, certain aperture layers and/or filter layers may be optional.

Figure 4B:
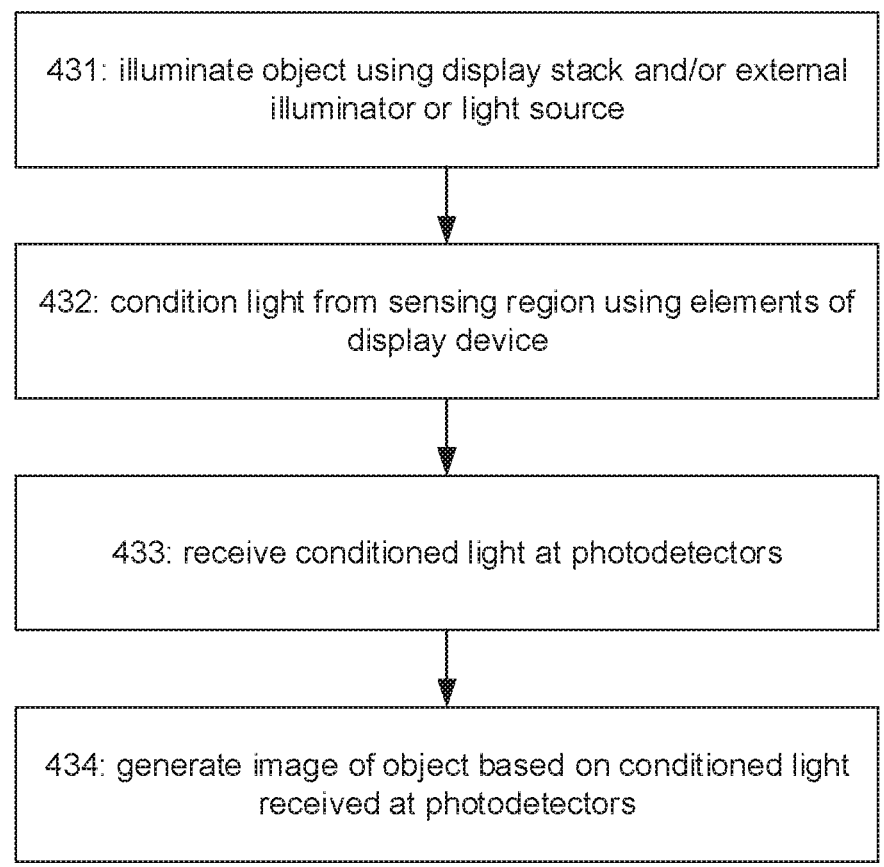
FIG. 4B is a schematic flowchart illustrating an example process for operating the optical sensor device shown in FIG. 4A.

FIG. 4B is a schematic flowchart illustrating an example process for operating the optical sensor device shown in FIG. 4A. At stage 431, an object to be imaged, such as a fingerprint, at a sensing region on a display device is illuminated using light from a display stack of the display device and/or an external illuminator or light source. At stage 432, light from the sensing region is conditioned using elements of the display device (through focusing, collimation, and/or reflection), such as one or more aperture layers, one or more filter layers, and one or more reflective focal elements. At stage 433, the conditioned light is received at photodetectors of the display device. At stage 434, a processing system of or connected to the display device generates an image of the object based on the conditioned light received at the photodetectors.

Figure 5:
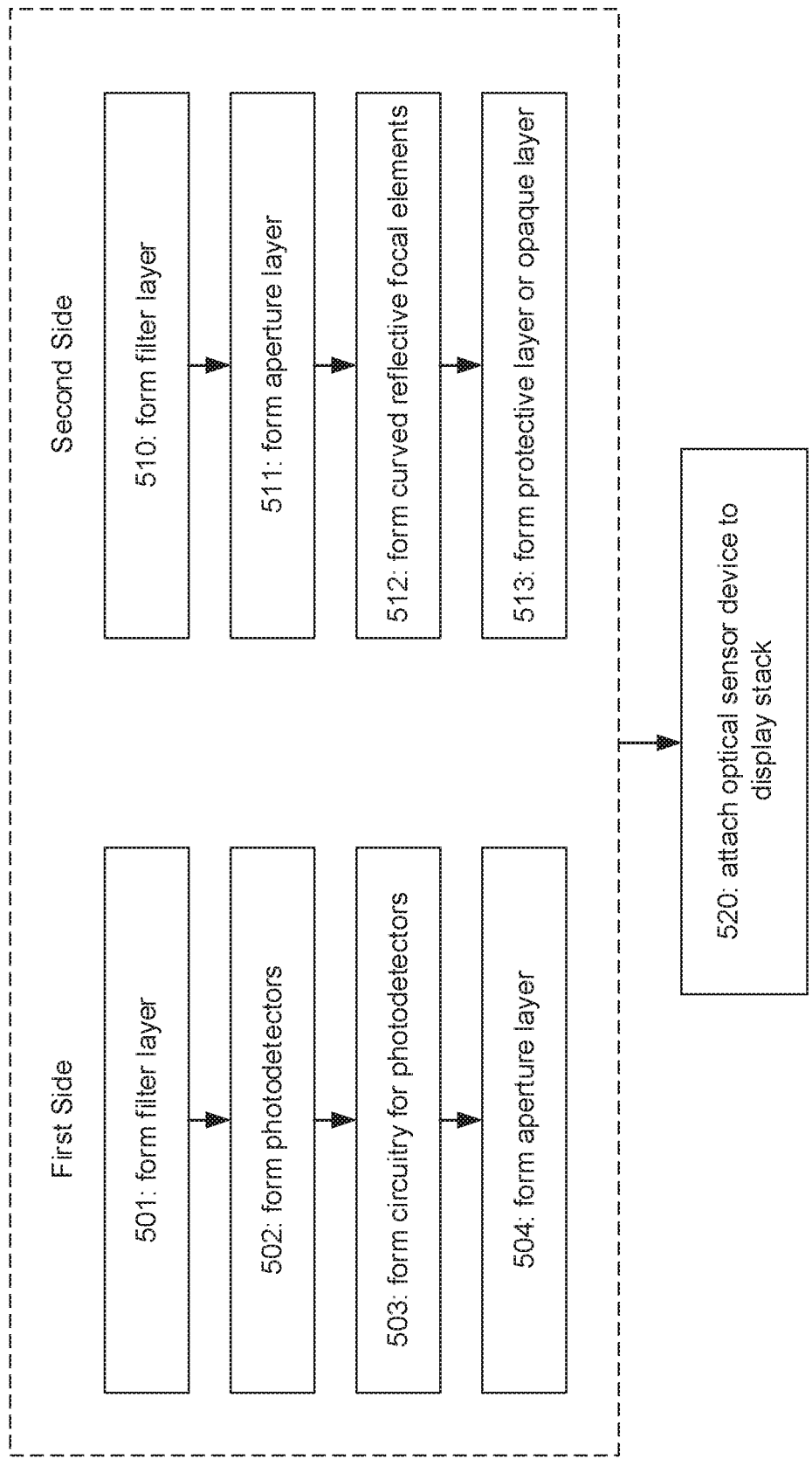
FIG. 5 is a schematic flowchart illustrating an example process for forming the optical sensor device shown in FIG. 4A.

FIG. 5 is a schematic flowchart illustrating an example process for forming the optical sensor device 401 shown in FIG. 4A. The left side of FIG. 5 within the dotted box depicts steps for forming the elements shown in FIG. 4A on a first side of the substrate 410, and the right side of FIG. 5 within the dotted box depicts steps for forming the elements shown in FIG. 4A on a second side of the substrate 410.

With respect to the first side of the substrate, at stage 501, a filter layer (e.g., 415b) is formed over the first side of the substrate via depositing/patterning; at stage 502, photodetectors (e.g., 412) are formed over the filter layer; at stage 503, circuitry for the photodetectors (e.g., 413) is formed over the photodetectors; and at stage 504, an aperture layer (e.g., 414b) is formed via depositing/patterning over the circuitry and the filter layer. Forming the filter layer at stage 501 may include, for example, depositing or attaching an IR and/or red filter, a reflected light filter, and/or an ambient light filter. Forming the photodetectors at stage 502 may include, for example, depositing and patterning photodetectors on top of the filter layer, or attaching photodetectors on top of the filter layer. Forming the circuitry for the photodetectors at stage 503 may include, for example, depositing and patterning circuitry for electrical routing and other circuitry above the photodetectors. Forming the aperture layer at stage 504 may include, for example, depositing and patterning opaque material above the other layers, with apertures in appropriate positions, as shown in FIG. 4A.

With respect to the second side of the substrate, at stage 510, a filter layer (e.g., 415a) is formed over the first side of the substrate via depositing/patterning; at stage 511, an aperture layer (e.g., 414a) is formed via depositing/patterning over the filter layer; at stage 512, curved reflective focal elements (e.g., 411) are formed at locations corresponding to apertures in the aperture layer; and at stage 513, a protective layer or opaque layer is formed over the reflective focal elements. Forming the filter layer at stage 510 may include, for example, depositing or attaching an IR and/or red filter, a reflected light filter, and/or an ambient light filter. Forming the aperture layer at stage 511 may include, for example, depositing and patterning opaque material above the other layers, with apertures in appropriate positions, as shown in FIG. 4A. Forming the curved reflective focal elements at stage 512 may include, for example, depositing and patterning a transparent hemispherical layer (which provides shaping for the curved reflective focal elements) followed by depositing a reflective material thereon. Alternatively, forming the curved reflective focal elements at stage 512 may include, for example, attaching curved reflective focal elements over the aperture layer. Forming the protective layer or opaque layer at stage 513 may include, for example, depositing a protective layer or opaque layer over the reflective focal elements.

It will be appreciated that the elements on the first side of the substrate may be formed first, followed by the elements on the second side being formed, or vice-versa. In an exemplary embodiment, stages 510-513 relating to the second side of the substrate are performed after stages 501-504 relating to the first side of the substrate. The steps may also be performed in other sequences and in other orders—for example, with some elements of both the bottom and top sides of the substrate being formed prior to either the top side or the bottom side being completed. The order of the steps shown in FIG. 5 is merely exemplary, and the steps may be performed in a different order in other exemplary embodiments.

At stage 520, after the optical sensor device is complete, it is attached to a display stack as depicted in FIG. 4A.

Figure 6:
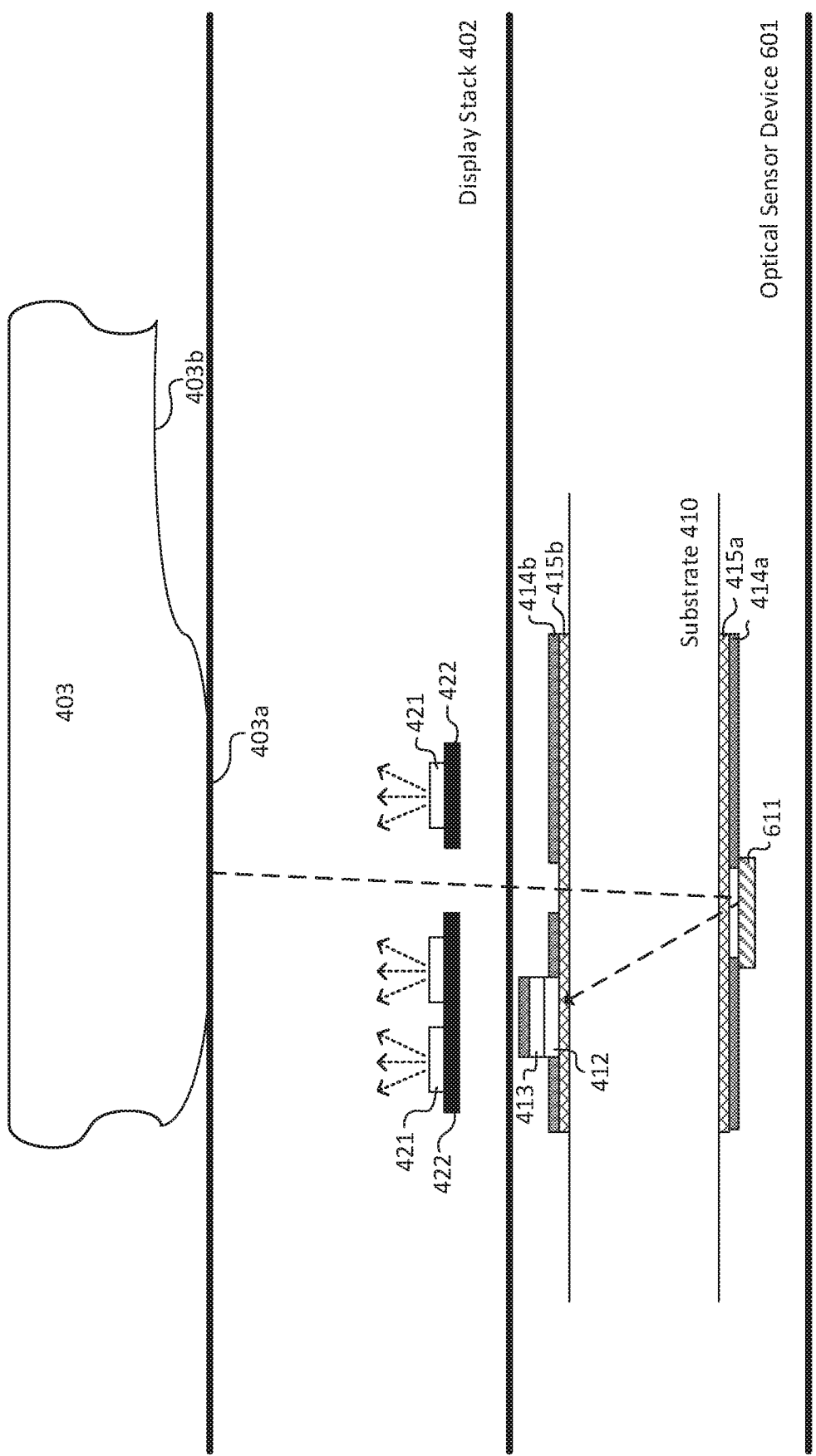
FIG. 6 is a schematic diagram illustrating another example display device having an optical sensor device with a folded light path.

FIG. 6 is a schematic diagram illustrating another example display device having an optical sensor device 601 with a folded light path. The optical sensor device 601 depicted in FIG. 6 is similar to the optical sensor device 401 depicted in FIG. 4A except that instead of reflective focal element 411 being curved, reflective focal element 611 is flat. For example, the reflective focal element 611 may be a patterned phase mirror (which behaves like a Fresnel mirror) configured to reflect light towards the photodetector 412. In one embodiment, the reflective focal element 611 has a flat, 2-dimensional shape which may be advantageous due to relative ease of manufacture, lower height, and the manufacturing process being more controllable, e.g., a single layer of photoresist and a single metal etch. It will be appreciated that the principles discussed above with respect to FIG. 4A are generally also applicable to FIG. 6.

Figure 7:
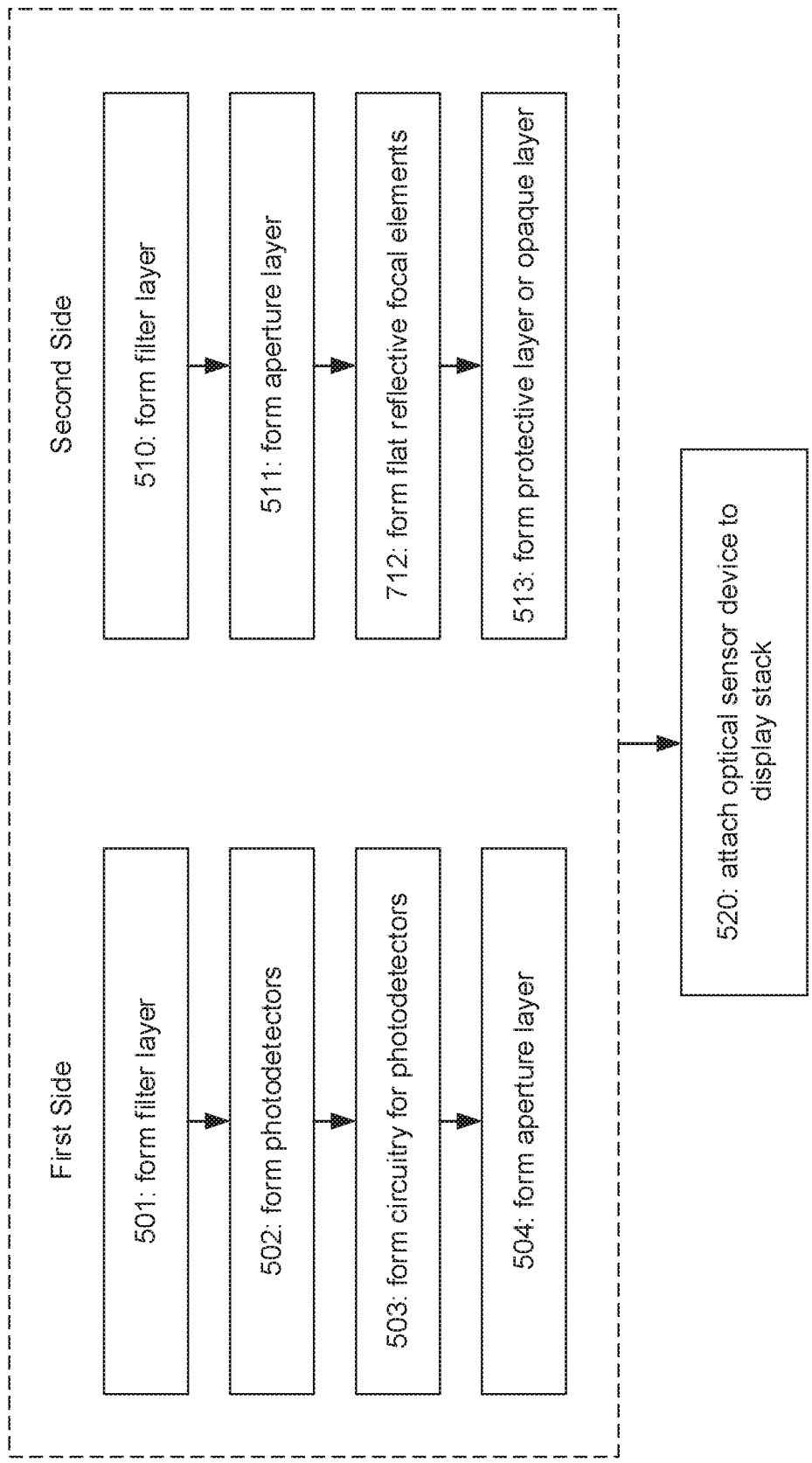
FIG. 7 is a schematic flowchart illustrating an example process for forming the optical sensor device shown in FIG. 6.

FIG. 7 is a schematic flowchart illustrating an example process for forming the optical sensor device 601 shown in FIG. 6. In view of the similarities between FIG. 6 and FIG. 4A, FIG. 7 is also similar to FIG. 5 except that stage 512 is replaced with stage 712. At stage 712, flat reflective focal elements are formed, for example, by depositing and patterning patterned phase mirrors using 1-μm photolithography, 2-μm photolithography or 3-μm photolithography, or by attaching patterned phase mirrors over the aperture layer. It will be appreciated that the principles discussed above with respect to FIG. 5 are generally also applicable to FIG. 7.

Figure 8:
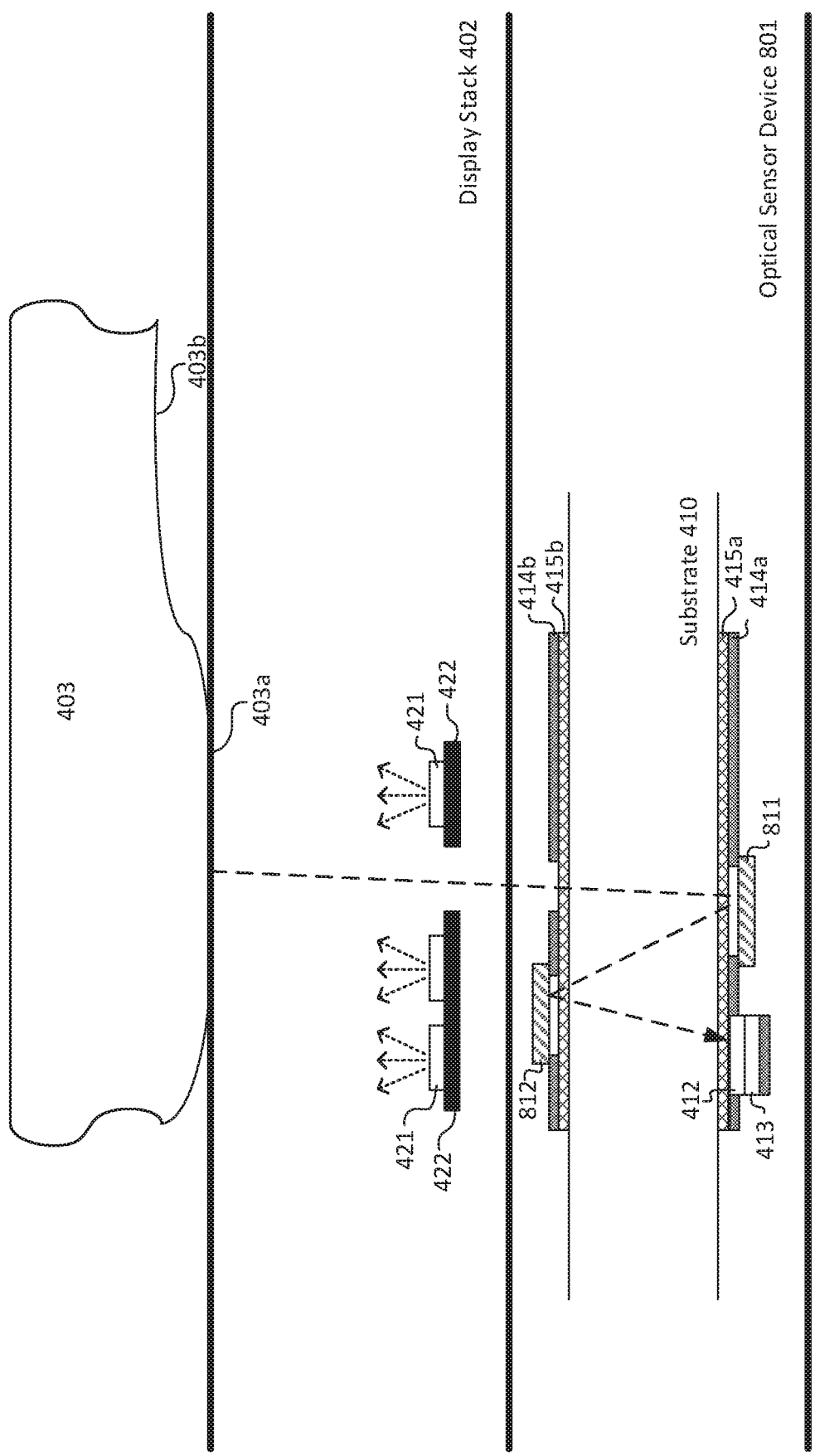
FIG. 8 is a schematic diagram illustrating another example display device having an optical sensor device with a folded light path.
Figure 9:
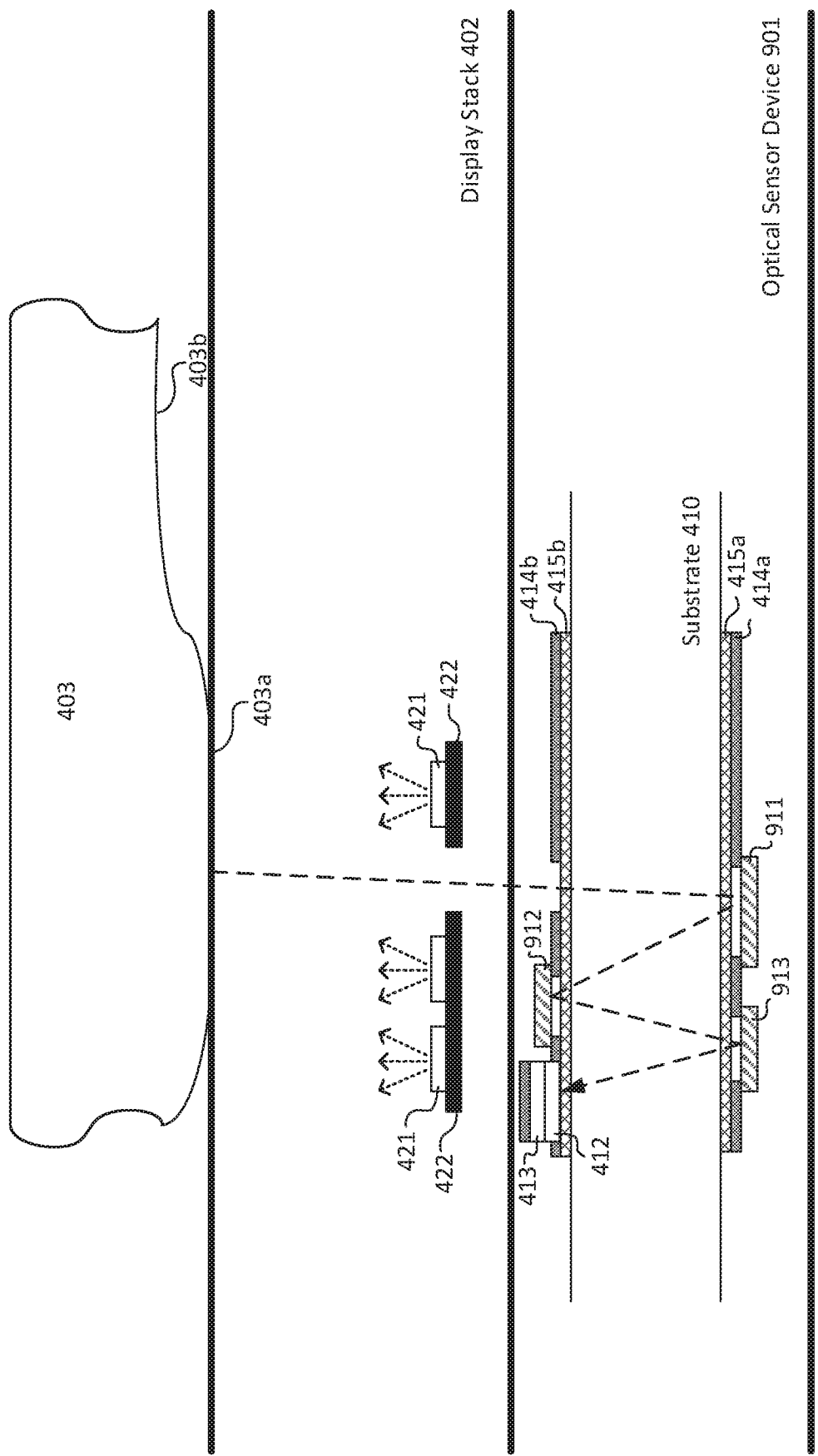
FIG. 9 is a schematic diagram illustrating another example display device having an optical sensor device with a folded light path.

FIGS. 8 and 9 are schematic diagrams illustrating other example display devices having an optical sensor device 801, 901 with a folded light path. The optical sensor device 801 depicted in FIG. 8 and the optical sensor device 901 depicted in FIG. 9 are similar to the optical sensor device 601 depicted in FIG. 6, but in FIG. 8 the optical path is folded twice using two reflective elements 811, 812, and in FIG. 9 the optical path is folded three times using three reflective elements 911, 912, 913 (whereas in FIG. 6 the optical path is folded once using one reflective element). At least one of the two reflective elements 811, 812 is a reflective focal element (e.g., similar to the flat reflective focal element 611 of FIG. 6), and at least one of the three reflective elements 911, 912, 13 of FIG. 9 is a reflective focal element (e.g., similar to the flat reflective focal element 611 of FIG. 6). It will be appreciated that the reflective elements 811, 812 in FIG. 8 and the reflective elements 911, 912, 913 in FIG. 9 may be appropriately aligned to reflect and focus light towards photodetector 412 as depicted in FIGS. 8 and 9. It will further be appreciated that the principles discussed above with respect to FIGS. 4 and 6 are generally also applicable to FIGS. 8 and 9.

It will also be appreciated that a process similar to the process shown in FIGS. 5 and 7, with appropriate modifications, may be utilized to produce the optical sensor device 801 of FIG. 8 and to produce the optical sensor device 901 of FIG. 9. For example, with respect to the optical sensor device 801 of FIG. 8, stages 502 and 503 may be implemented with respect to the second side of the substrate instead of with respect to the first side of the substrate, and stage 712 may additionally be implemented with respect to the first side of the substrate. With respect to the optical sensor device 901 of FIG. 9, stage 712 may additionally be implemented with respect to the first side of the substrate.

Folding the light path more than once allows for the optical sensor device to be even thinner. For example, in an exemplary implementation, the thickness of the optical sensor device 801 depicted in FIG. 8 may be 100 um, and the thickness of the optical sensor device 901 depicted in FIG. 9 may be 50 um.

Figure 10:
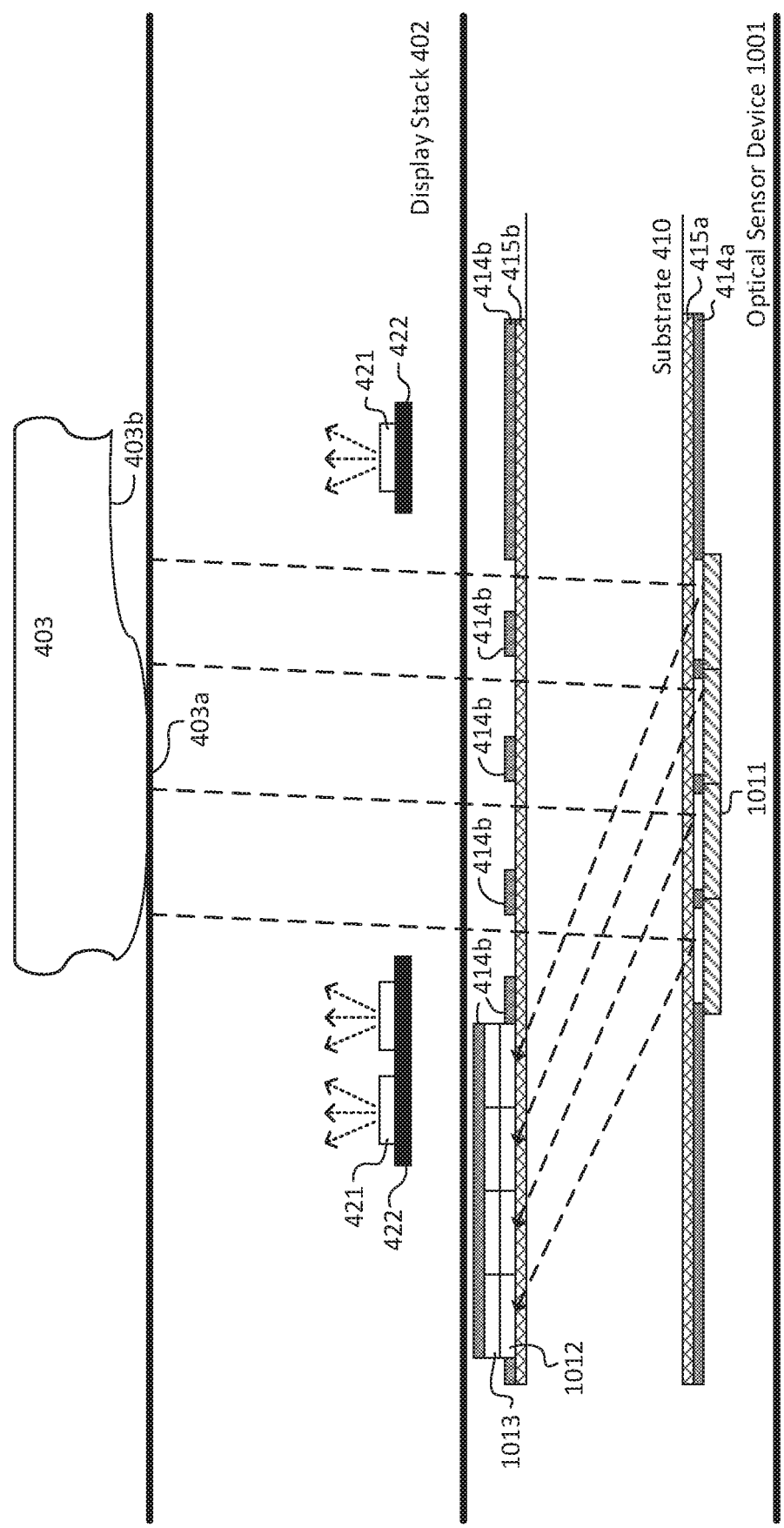
FIG. 10 is a schematic diagram illustrating another example display device having an optical sensor device with a folded light path.

FIG. 10 is a schematic diagram illustrating another example display device having an optical sensor device 1001 with a folded light path. The optical sensor device 1001 depicted in FIG. 10 is similar to the optical sensor device 601 depicted in FIG. 6, except that a large reflective focal element 1011 (e.g., a patterned phase mirror) having multiple domains is used, wherein each domain of the reflective focal element 1011 has a respective focal region associated therewith that corresponds to a respective photodetector 1012. Each respective photodetector 1012 has corresponding photodetector circuitry 1013. Additionally, opaque material of the aperture layer 414a may be disposed between adjacent domains of the patterned phase mirror to provide for separation between the domains and to reduce interference. Thus, in the exemplary embodiment depicted in FIG. 10, multiple photodetectors 1012 of the optical sensor device 1001 are positioned adjacent to each other, and the reflective focal element 1011 having multiple domains provides for reflection and focusing of light towards the photodetectors 1012 of the optical sensor device 1001. The photodetectors 1012 have a one-to-one correspondence with respective domains of the reflective focal element 1011, such that each respective domain of the reflective focal element reflects and focuses light towards a respective photodetector 1012.

It will further be appreciated that the principles discussed above with respect to FIGS. 4, 6, 8 and 9 are generally also applicable to FIG. 10. It will also be appreciated that a process similar to the process shown in FIGS. 5 and 7, with appropriate modifications, may be utilized to produce the optical sensor device 1011 of FIG. 10.

Figure 11:
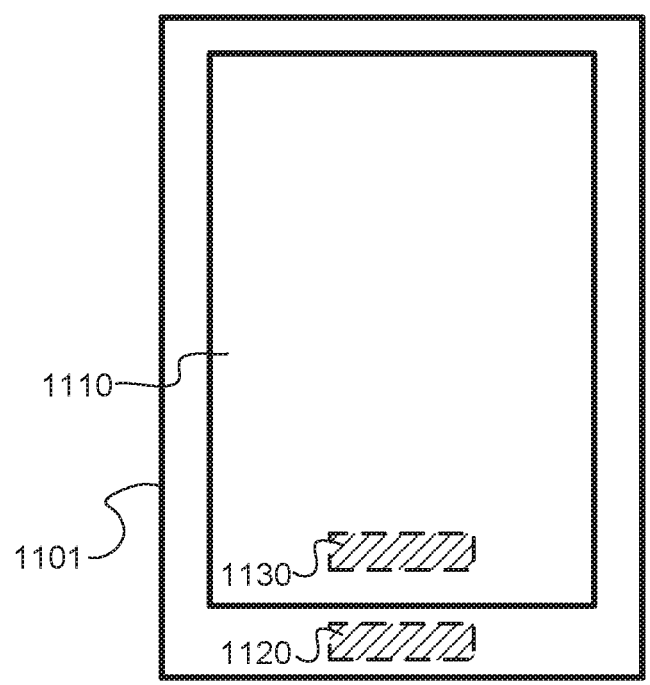
FIG. 11 is a schematic diagram illustrating an example display device having a display and an optical sensor.

FIG. 11 is a schematic diagram illustrating an example display device 1101 having a display 1110 and an optical sensor area 1120. The display device 1101 may be, for example, a mobile device such as a smartphone or tablet. The display device 1101 includes a display 1110 which may be, for example, a touchscreen. The optical sensor, which may be, for example, an optical fingerprint sensor, may be disposed outside of the display area in the optical sensor area 1120 while an optical sensing area/region 1130 corresponding to the optical sensor is disposed in the display area.

In other exemplary embodiments, the optical sensor may be integrated into a personal computer (PC) such as a laptop, or into an automobile human-machine interface.

Figure 12:
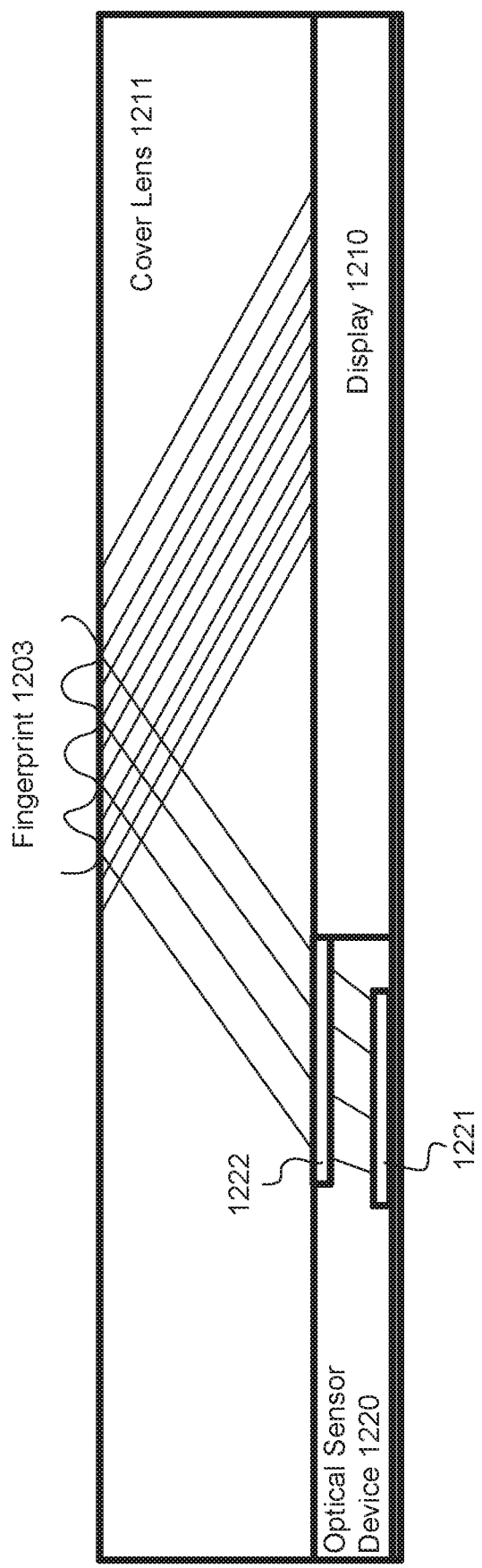
FIG. 12 is a schematic diagram illustrating an example display device having a display and an optical sensor device.

FIG. 12 is a schematic diagram illustrating another example display device having a display 1210 and an optical sensor device 1220. As discussed above with respect to FIG. 11, an optical sensing area/region corresponding to optical sensor 1221 may be positioned over display 1210 in a display area, whereas the optical sensor 1221 is outside of the display area. Light emitted by display 1210 travels through cover lens 1211 and is reflected off a top surface of the cover lens 1211 to image an object, such as a fingerprint 1203, in the optical sensing area/region. The light reflected from the optical sensing area/region is conditioned by a focal element 1222 (e.g., a phase lens), which focuses the light towards optical sensor 1221. The optical sensor 1221 may be, for example, a TFT imaging sensor such as a complementary-metal-oxide-semiconductor (CMOS) imaging sensor (CIS). The focusing element 1222 may be a phase lens having a higher refractive index than that of the cover lens 1211, and thus focuses reflected light incident on the focusing element 1222 towards optical sensor 1221. The focusing of the light allows for optical sensor 1221 to occupy a relatively small footprint.

Figure 13:
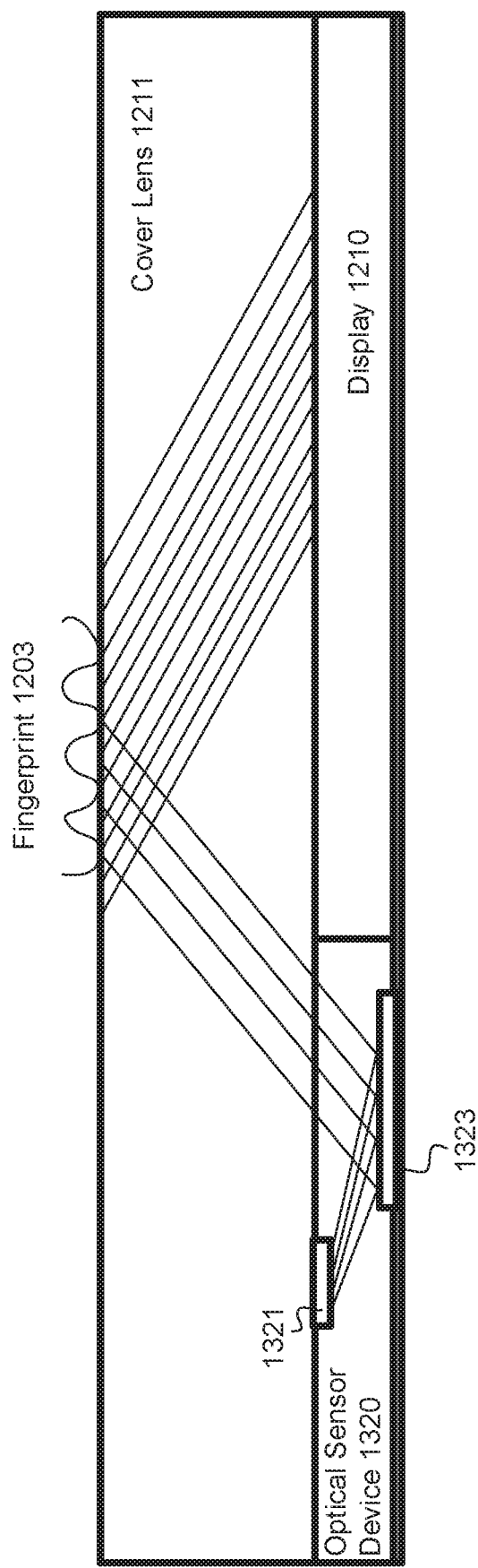
FIG. 13 is a schematic diagram illustrating another example display device having a display and an optical sensor device.

FIG. 13 is a schematic diagram illustrating another example display device having a display 1210 and an optical sensor device 1320. The optical sensor device 1320 includes a reflective focal element 1323 (e.g., a phase mirror). Light reflected from an optical sensing area/region is focused and reflected by the reflective focal element 1323 towards the optical sensor 1321. The optical sensor device 1320 of FIG. 13 may have a small overall thickness due to the use of the folded light path.

Figure 14:
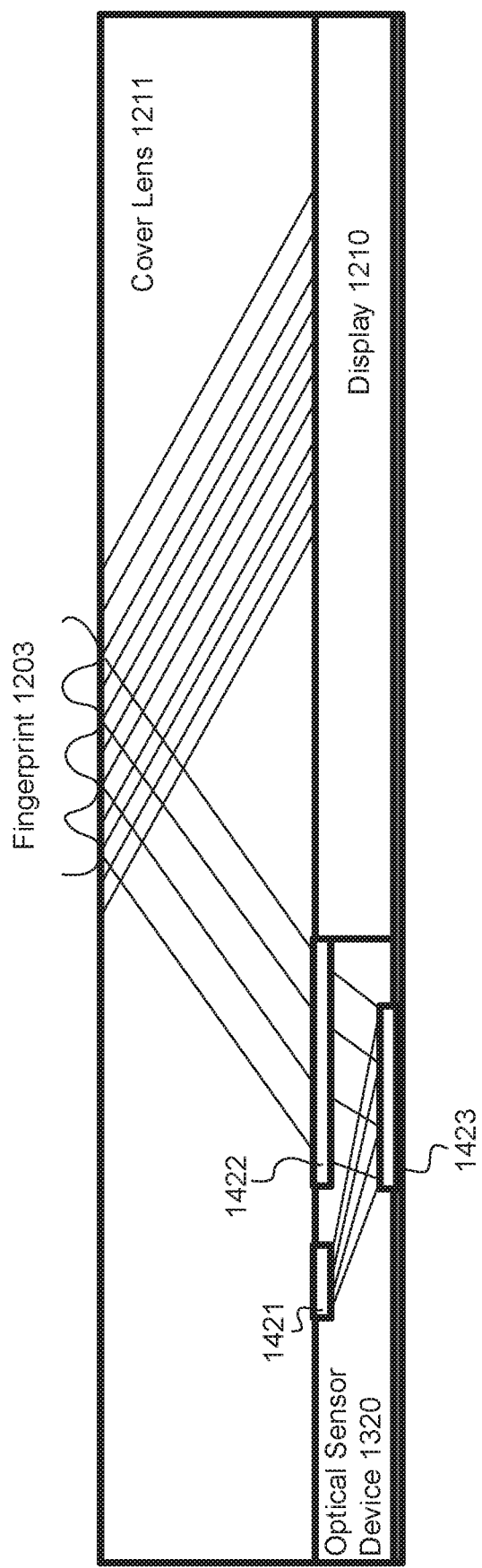
FIG. 14 is a schematic diagram illustrating another example display device having a display and an optical sensor device.

FIG. 14 is a schematic diagram illustrating another example display device having a display 1210 and an optical sensor device 1420. The optical sensor device 1420 includes both a focal element 1422 (e.g. a phase lens) a reflective focal element 1423 (e.g., a phase mirror). Light reflected from an optical sensing area/region is focused by focal element 1422 and further reflected and focused by reflective focal element 1423 towards optical sensor 1421.

It will be appreciated that the principles discussed above with respect to FIGS. 11-13 may be combined with the principles discussed above with respect to FIGS. 3-10 in certain exemplary embodiments. For example, in an exemplary embodiment, a focusing element such as a phase lens may be included on the top side of the substrate 410 with respect to the embodiments shown in FIGS. 4, 6, 8, 9 and 10 to provide for focusing of light before it reaches the respective reflective elements 411, 611, 811, 911, 1011.

Exemplary embodiments of the present disclosure may further be used to distinguish between real biometric inputs versus fake biometric inputs (e.g., a real fingerprint versus a spoofed fingerprint). Fake biometric inputs tend to be flatter and real biometric inputs tend to be more rounded, which causes fake biometric inputs and real biometric inputs to have different dispersion properties. Thus, by comparing on-axis and off-axis information, a processing system connected to the optical sensor device may be able to determine whether a biometric input is real or fake. By illuminating both on and off collimation axis light, the change in collimated sensor response may be processed to determine likelihood of a fake biometric input, e.g., a different partial set of illuminated display subpixel change in response to dispersion may be processed.

It will be appreciated that although some of the examples discussed herein demonstrate the exemplary implementations of the disclosure with respect to optical fingerprint sensors configured for detecting ridges and valleys of a fingerprint, these techniques may also be used in other embodiments for other types of sensors (e.g., an optical fingerprint sensor configured for detecting minutiae, an optical palm sensor, etc.).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An optical sensor device, comprising:
a substrate;
a plurality of first reflectors disposed on the substrate; and
an optical sensor comprising a plurality of photodetectors disposed on the substrate, wherein each respective photodetector of the plurality of photodetectors corresponds to a respective reflector of the plurality of first reflectors;
wherein each respective reflector of the plurality of first reflectors is configured to reflect light from a sensing region corresponding to the optical sensor towards a respective photodetector or a respective array of photodetectors of the plurality of photodetectors.

2. The optical sensor device according to claim 1, wherein a respective reflector of the plurality of first reflectors comprises a patterned phase mirror, a curved mirror, a bent mirror, or a multi-domain mirror.

3. The optical sensor device according to claim 1, further comprising:
a first aperture layer disposed on a first side of the substrate.

4. The optical sensor device according to claim 3, further comprising:
a second aperture layer disposed on a second side of the substrate.

5. The optical sensor device according to claim 1, further comprising:
a first filter layer disposed on a first side of the substrate.

6. The optical sensor device according to claim 5, wherein the first filter layer comprises an infrared filter, a red light filter, a reflected light filter, or an ambient light filter.

7. The optical sensor device according to claim 5, further comprising:
a second filter layer disposed on a second side of the substrate.

8. The optical sensor device according to claim 7, wherein the first filter layer comprises an infrared filter, a red light filter, a reflected light filter, or an ambient light filter; and
wherein the second filter layer comprises an infrared filter, a red light filter, a reflected light filter, or an ambient light filter.

9. The optical sensor device according to claim 8, wherein the second filter layer comprises a different type of filter relative to the first filter layer.

10. The optical sensor device according to claim 1, wherein the plurality of first reflectors is disposed on a first side of the substrate; and
wherein the optical sensor device further comprises: a plurality of second reflectors disposed on a second side of the substrate.

11. An optical sensor device, comprising:
a substrate;
a first reflector disposed on the substrate, wherein the first reflector comprises a plurality of domains; and
an optical sensor comprising a plurality of photodetectors disposed on the substrate;
wherein each respective domain of the plurality of domains has a respective focal region corresponding to a respective photodetector of the plurality of photodetectors such that each respective domain of the plurality of domains is configured to reflect light from a sensing region corresponding to the optical sensor towards a different respective photodetector of the plurality of photodetectors.

12. The optical sensor device according to claim 11, wherein the optical sensor device further comprises:
a phase lens configured to focus light reflected from the sensing region which is received at the phase lens.

13. A display device, comprising:
a display; and
an optical sensor device configured to image an object, wherein the optical sensor device comprises:
a substrate;
a plurality of first reflectors disposed on the substrate; and
an optical sensor comprising a plurality of photodetectors disposed on the substrate, wherein each respective photodetector of the plurality of photodetectors corresponds to a respective reflector of the plurality of first reflectors;
wherein each respective reflector of the plurality of first reflectors is configured to reflect light from a sensing region corresponding to the optical sensor towards a respective photodetector or a respective array of photodetectors of the plurality of photo detectors.

14. The display device according to claim 13, wherein the optical sensor device is disposed under the display.

15. The display device according to claim 13, wherein the optical sensor device is disposed adjacent to the display in a side-by-side configuration.

16. The display device according to claim 13, wherein the display is configured to illuminate the object.

17. The display device according to claim 13, wherein the display device further comprises:
an external light source separate from the display, wherein the external light source is configured to illuminate the object.

18. A method for optically imaging an object using a display device, the method comprising:
illuminating, by the display device, an object at a sensing region corresponding to an optical sensor of the display device;
conditioning, by the display device, light from the sensing region, wherein conditioning the light includes focusing and reflecting the light via a plurality of first reflectors, wherein each respective reflector of the plurality of first reflectors is configured to reflect light from the sensing region towards a respective photodetector or a respective array of photodetectors of a plurality of photodetectors of the optical sensor;
receiving, by the display device, the conditioned light at the plurality of photodetectors of the optical sensor, wherein each respective photodetector of the plurality of photodetectors corresponds to a respective reflector of the plurality of first reflectors; and
generating, by a processing system associated with the display device, an image of the object based on the conditioned light received at the plurality of photodetectors of the optical sensor.

19. The method according to claim 18, wherein conditioning the light from the sensing region further includes collimating the light using two or more aperture layers.

20. The method according to claim 18, wherein a light path of light from the sensing region which reaches the optical sensor comprises two or more folds.

21. The optical sensor device according to claim 11, further comprising:

an aperture layer disposed on the substrate between the first reflector and the substrate, wherein the aperture layer comprises opaque material disposed between adjacent domains of the plurality of domains of the first reflector.

* * * * *

UNITED STATES PATENT AND TRADEMARK OFFICE
CERTIFICATE OF CORRECTION

PATENT NO. : 10,990,225 B2
APPLICATION NO. : 16/450211
DATED : April 27, 2021
INVENTOR(S) : Joseph Kurth Reynolds Page 1 of 3

It is certified that error appears in the above-identified patent and that said Letters Patent is hereby corrected as shown below:

In the Claims

At Column 15: Lines 8-20, Claim 1, please delete:
"An optical sensor device, comprising:
a substrate;
a plurality of first reflectors disposed on the substrate; and
an optical sensor comprising a plurality of photodetectors disposed on the substrate, wherein each respective photodetector of the plurality of photodetectors corresponds to a respective reflector of the plurality of first reflectors;
wherein each respective reflector of the plurality of first reflectors is configured to reflect light from a sensing region corresponding to the optical sensor towards a respective photodetector or a respective array of photodetectors of the plurality of photodetectors."

And please add:
--An optical sensor device, comprising:
a substrate;
a plurality of first reflectors disposed on the substrate; and
an optical sensor comprising a plurality of photodetectors disposed on the substrate, wherein each respective photodetector of the plurality of photodetectors corresponds to a respective reflector of the plurality of first reflectors, and wherein each of the plurality of first reflectors corresponds to a different portion of a sensing region corresponding to the optical sensor device;
wherein each respective reflector of the plurality of first reflectors is configured to reflect light from a respective portion of the sensing region towards a respective photodetector or a respective array of photodetectors of the plurality of photodetectors.--

At Column 16: Lines 9-25, Claim 13, please delete:
"A display device, comprising:
a display; and
an optical sensor device configured to image an object, wherein the optical sensor device comprises:
    a substrate;

Signed and Sealed this
Eighth Day of June, 2021

Drew Hirshfeld
*Performing the Functions and Duties of the
Under Secretary of Commerce for Intellectual Property and
Director of the United States Patent and Trademark Office* a plurality of first reflectors disposed on the substrate; and an optical sensor comprising a plurality of photodetectors disposed on the substrate, wherein each respective photodetector of the plurality of photodetectors corresponds to the respective reflector of the plurality of first reflectors;

wherein each respective reflector of the plurality of first reflectrors is configured to reflect light from a sensing region corresponding to the optical sensor towards a respective photodetector or a respective array of photodetectors of the plurality of photo detectors."

And please add:
--A display device, comprising:
a display; and
an optical sensor device configured to image an object, wherein the optical sensor device comprises:
a substrate;
a plurality of first reflectors disposed on the substrate; and
an optical sensor comprising a plurality of photodetectors disposed on the substrate, wherein each respective photodetector of the plurality of photodetectors corresponds to a respective reflector of the plurality of first reflectors, and wherein each of the plurality of first reflectors corresponds to a different portion of a sensing region corresponding to the optical sensor device;
wherein each respective reflector of the plurality of first reflectors is configured to reflect light from a respective portion of the sensing region towards a respective photodetector or a respective array of photodetectors of the plurality of photodetectors.--

At Column 16: Lines 38-59, Claim 18, please delete:
"A method for optically imaging an object using a display device, the method comprising:
illuminating, by the display device, an object at a sensing region corresponding to an optical sensor of the display device;
conditioning, by the display device, light from the sensing region, wherein conditioning the light includes focusing and reflecting the light via a plurality of first reflectors, wherein each respective reflector of the plurality of first reflectors is configured to reflect light from trhe sensing region towards a respective photodetector or a respective array of photodetectors of a lurality of photodetectors of the optical sensor;
receiving, by the display device, the conditioned light at the pulrality of photodetectors of the optical sensor, wherein each respective photodetector of the plurality of photodetectors corresponds to a respective reflector of the plurality of first reflectors; and
generating, by a processing system associated with the display device, an image of the object based on the conditioned light received at the purality of photodetectors of the optical sensor."

And please add:
--A method for optically imaging an object using a display device, the method comprising:
illuminating, by the display device, an object at a sensing region corresponding to an optical sensor of the display device;
conditioning, by the display device, light from the sensing region, wherein conditioning the light includes focusing and reflecting the light via a plurality of first reflectors, wherein each of the plurality of first reflectors corresponds to a different portion of the sensing region, and wherein each respective reflector of the plurality of first reflectors is configured to reflect light from a respective portion of the sensing region towards a respective photodetector or a respective array of photodetectors of a plurality of photodetectors of the optical sensor;
receiving, by the display device, the conditioned light at the plurality of photodetectors of the optical sensor, wherein each respective photodetector of the plurality of photodetectors corresponds to a respective reflector of the plurality of first reflectors; and
generating, by a processing system associated with the display device, an image of the object based on the conditioned light received at the plurality of photodetectors of the optical sensor.--